Patented Oct. 11, 1938

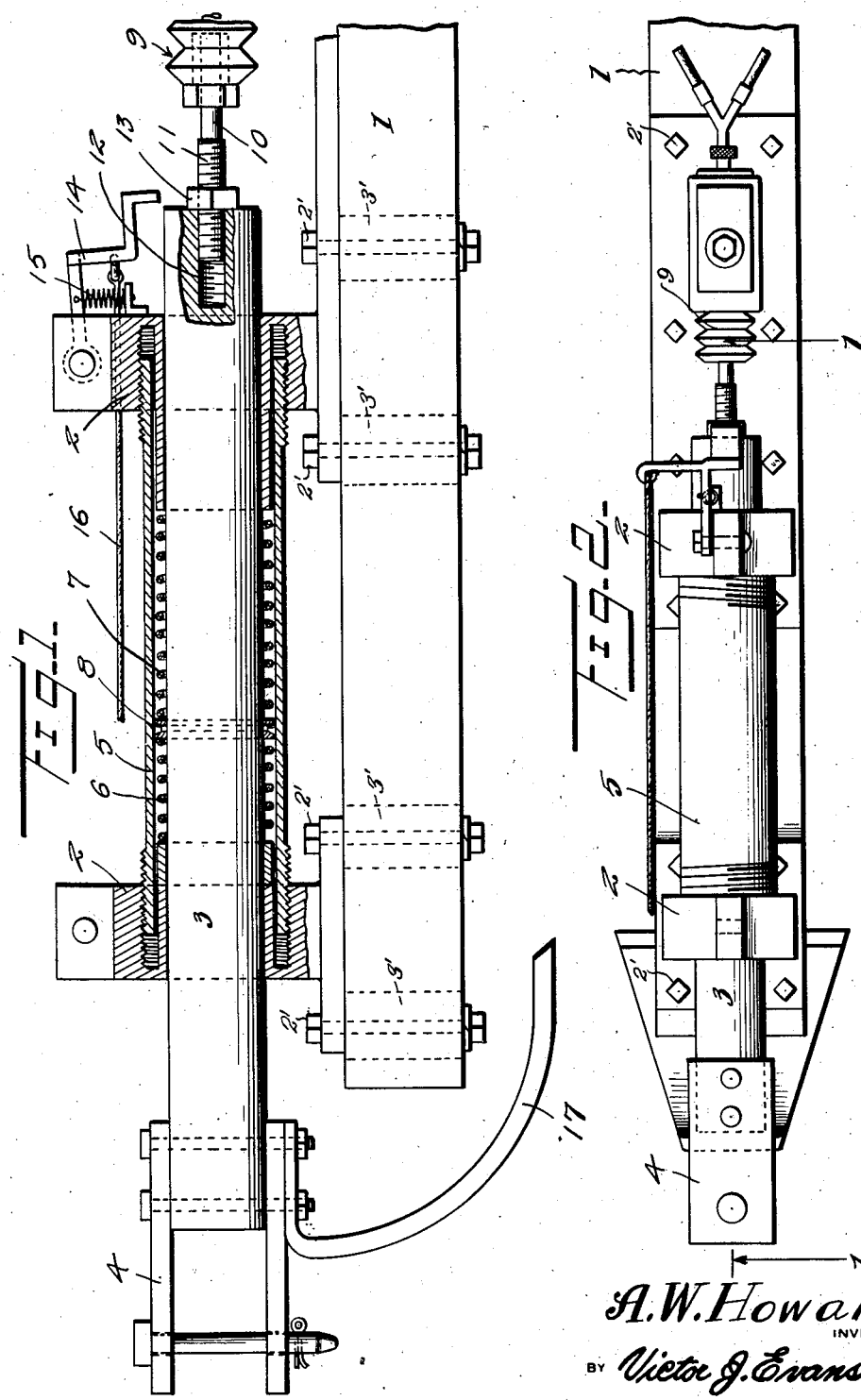

2,133,195

UNITED STATES PATENT OFFICE 2,133,195

AUTOMATIC BRAKE CONTROL TRAILER HITCH

Arthur W. Howard, Monon, Ind.

Application June 4, 1937, Serial No. 146,515

4 Claims. (Cl. 188—142)

This invention relates to a brake control hitch for trailers and has for the primary object the provision of a device of this character which is especially adapted for actuating brakes of the hydraulic type on a trailer and which will be automatic in operation, bringing about application of the brakes when the towing vehicle slows down and stops and releases said brakes when the towing vehicle pulls the trailer and has means for rendering the device inoperative so that the trailer may be backed by the towing vehicle without the application of the brakes.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a sectional view showing a brake control trailer hitch constructed in accordance with my invention and taken on the line 1—1 of Figure 2.

Figure 2 is a top plan view illustrating the device.

Referring in detail to the drawing, the numeral 1 indicates a fixed member forming part of a trailer (not shown) and has mounted thereon supporting elements 2 capable of being adjusted relative to each other by being adjustably secured on the fixed member 1. Bolts 2' carried by the supporting elements 2 extend through slots 3' in the member 1 to permit the elements 2 to be adjusted as described. The supporting members 2 are in the form of bearings to slidably support a shaft 3, one end of which has secured thereto a clevis 4 for detachably connecting the shaft onto a towing vehicle. The supporting members 2 have internally screw threaded recesses in which are threaded the ends of a tube 5. One end of the tube 5 has right hand screw threads and the opposite end has left hand screw threads and the screw threads of the supporting members 2 correspond with the screw threads of the tube. This arrangement permits by the rotation of the tube in opposite directions the adjustment of the supporting members towards and from each other after they have been released from the fixed member 1 for the adjustment. Mounted on the shaft 3 and located within the tube 5 are coil springs 6 and 7 each bearing on a collar 8 fixed on the shaft 3. The spring 6 seats against one of the supporting members 2 and the spring 7 seats against the other supporting member 2. By adjusting the supporting members relative to each other, the tension of the springs 6 and 7 may be varied. The spring 6 acts as a cushion for absorbing shocks due to the towing vehicle starting to tow the trailer. The spring 7 acts as a cushion for the application of brakes of the trailer which will be hereinafter more fully described.

A portion of the hydraulic brakes of the trailer is indicated by the character 9. This portion of the brake includes a stem 10 connected to the usual master piston (not shown) and has a screw threaded portion 11 which threads into a screw threaded socket 12 of the shaft 3. A lock nut 13 is provided on the screw threaded portion 11 to engage one end of the shaft for securing the stem in its adjusted positions with respect to the shaft 3. By adjusting the stem 10 relative to the shaft various throws may be had on the master pistons of the hydraulic brakes.

In operation, when the towing vehicle attached to the clevis 4 starts to travel forwardly the shaft 3 slides a limited distance in the supporting members 2 until the spring 6 is compressed allowing the trailer to be gradually started in motion. Should the towing vehicle slow down the trailer or the fixed member advances towards the towing vehicle due to its momentum compressing the spring 7 and at the same time the master piston 10 of the hydraulic brakes tends to move forwardly with the trailer, however, is resisted by the shaft 3 bringing about the application of the brakes on the trailer thereby slowing down the trailer to the speed of the towing vehicle.

Should it be desired to back the trailer by the towing vehicle a latch element 14 is pivotally mounted on one of the supporting members 2 and may be brought into engagement with the rear end of the shaft 3 which will prevent a rearward endwise movement of the shaft 3 and thereby prevent application of the brakes when the trailer is backed by the towing vehicle. The latch 14 is normally held out of the path of movement of the shaft 3 by a spring 15. An operating cable 16 is connected to the latch 14 and extends to the driver of the towing vehicle whereby the driver at any time desired may bring the latch in a position to engage with the rear end of the shaft 3.

A shoe 17 is secured to the forward end of the shaft 3 and extends below the fixed member of the trailer so that should the clevis 4 become accidentally disconnected from the towing vehicle the shoe 17 will engage with the ground. The shoe engaging the ground will place a drag on the shaft 3 which with the momentum of the trailer will bring about application of the trailer brakes.

What is claimed is:

1. An automatic brake control trailer hitch comprising spaced supporting members adjustably mounted on a fixed member of a trailer, a shaft slidably supported by said members, a clevis for connecting said shaft to a towing vehicle, a collar secured on said shaft, coil springs engaging opposite sides of the collar and having seated engagement with said supporting members, and means for connecting the shaft to a master piston of a hydraulic brake system of the trailer.

2. An automatic brake controlled trailer hitch comprising spaced supporting members adjustably mounted on a fixed member of a trailer, a shaft slidably supported by said members, a clevis for connecting said shaft to a towing vehicle, a collar secured on said shaft, coil springs engaging opposite sides of the collar and having seated engagement with said supporting members, a tube adjustably connecting said supporting members and enclosing the springs, and means adjustably connecting the shaft to a master piston of a hydraulic brake system of the trailer.

3. An automatic brake control trailer hitch comprising spaced supporting members adjustably mounted on a fixed member of a trailer, a shaft slidably supported by said members, a clevis for connecting said shaft to a towing vehicle, a collar secured on said shaft, coil springs engaging opposite sides of the collar and having seated engagement with said supporting members, a tube adjustably connecting said supporting members for enclosing the springs, means adjustably connecting the shaft to a master piston of a hydraulic brake system of the trailer, a spring influenced catch carried by one of the supporting members, and a control connected to said catch to be moved in engagement with one end of the shaft to prevent endwise movement of the shaft in one direction and thereby allow the towing vehicle to back the trailer without application of the brakes on said trailer.

4. An automatic brake controlled trailer hitch comprising spaced supporting members adjustably mounted on a fixed member of a trailer, a shaft slidably supported by said members, a clevis for connecting said shaft to a towing vehicle, a collar secured on said shaft, coil springs engaging opposite sides of the collar and having seated engagement with said supporting members, a tube adjustably connecting said supporting members and enclosing the springs, means adjustably connecting the shaft to a master piston of a hydraulic brake system of the trailer, a spring influenced catch carried by one of the supporting members, and a control connected to said catch to be moved in engagement with one end of the shaft to prevent endwise movement of the shaft in one direction and thereby allow the towing vehicle to back the trailer without application of the brakes on said trailer, and a shoe secured to the shaft to contact the ground should the shaft become accidentally disconnected from the towing vehicle and thereby place a drag on the shaft to bring about application of the brakes on the trailer.

ARTHUR W. HOWARD.